March 15, 1966  R. S. JONES  3,240,283
FLEXIBLE SKIRTING COMPONENTS FOR GROUND EFFECT MACHINES
Filed Jan. 14, 1963  2 Sheets-Sheet 1

INVENTOR
RICHARD STANTON JONES

BY *Larson and Taylor*

ATTORNEYS

March 15, 1966 R. S. JONES 3,240,283
FLEXIBLE SKIRTING COMPONENTS FOR GROUND EFFECT MACHINES
Filed Jan. 14, 1963 2 Sheets-Sheet 2

INVENTOR
RICHARD STANTON JONES

BY *Larson and Taylor*

ATTORNEYS

United States Patent Office 3,240,283
Patented Mar. 15, 1966

3,240,283
FLEXIBLE SKIRTING COMPONENTS FOR GROUND EFFECT MACHINES
Richard Stanton Jones, Cowes, Isle of Wight, Hampshire, England, assignor to Westland Aircraft Limited, Yeovil, Somerset, England
Filed Jan. 14, 1963, Ser. No. 251,340
Claims priority, application Great Britain, Jan. 26, 1962, 3,150/62
1 Claim. (Cl. 180—7)

This invention relates to ground effect vehicles of the peripheral jet type, that is, those which in one phase of their operation are wholly or partially supported by a pressurized air or gas cushion generated between the base platform structure of the vehicle and the surface over which it is operating.

In the interests of power economy, it is desirable to operate such vehicles as close to the surface as possible. The vehicle must, however, be able to achieve a clearance height such that the risks of wave or obstacle impacts upon the rigid base platform structure are avoided as far as possible, particularly as the platform structures are light and often constitute bouyancy chambers enabling such vehicles to alight on water.

In order to reduce the effects of such wave or obstacle impact upon the rigid structure of the vehicle and to increase the operating wave and obstacle clearance heights, retard the escape of the ground effect pressurized air or gas cushion, provide more positive cushion compartmentation, enable stability adjustments, and also to enable the matching of the vehicle to the "ride" over preselected sea states, it has variously been proposed to provide the rigid base platform of such a vehicle with depending flexible components such as peripheral jet systems, skirting, stability keels and jets, pressure separators and side or end walls all of which, for the purposes of brevity, will be referred to as flexible components.

In all such flexible components, whether the component includes pressure air or gas passages and jet orifices or not, it is an essential requirement that the component should not only be capable of local deflection by impact, but also capable of reassuming the functional configuration, shape, attitude or setting after impact or clearance of the obstacle or wave, and in some cases deflection as a composite structure as a whole upon impact may be required.

Broadly speaking it may be said that most practical arrangements are of composite construction and may include bracings such as internal, external, embedded or otherwise connected diaphragms, ties or membranes. In addition, bracing may be supplemented or effected by inflation. Such braced constructions are arranged to resist unwanted deformations and deflections and to bias the components to re-assume functional shape or attitude after impact deflection.

The invention is primarily concerned with peripheral flexible jet skirting and stability jet skiriting and provides, primarily with such components, a strength requirement necessary to ensure satisfactory operation of a skirted vehicle, irrespective of the size. However, the invention may advantageously be applied to the construction of flexible side walls, end walls, keels and peripheral skirtings which do not necessarily incorporate air passages and jet systems.

The invention consists in a ground effect vehicle of the type set forth, comprising a base platform including pressurized gas or air cushion generating arrangements and a skirting extending below the base platform, in a manner as to retard the escape of the pressurized gas or air cushion so as to increase the clearance height of the vehicle during operation, characterised in that said skirting is fabricated from highly flexible or flaccid material selected to provide a strength which is not less than 500 pounds per inch run throughout the skirting and which in pounds per inch run is 250 times the distance measured in feet that the skirt extends below the base platform for skirts extending below the platform by a distance exceeding two feet.

Further objects and advantages of the invention will become readily apparent from the following detailed description with reference to the accompanying drawings in which.

Figure 1:
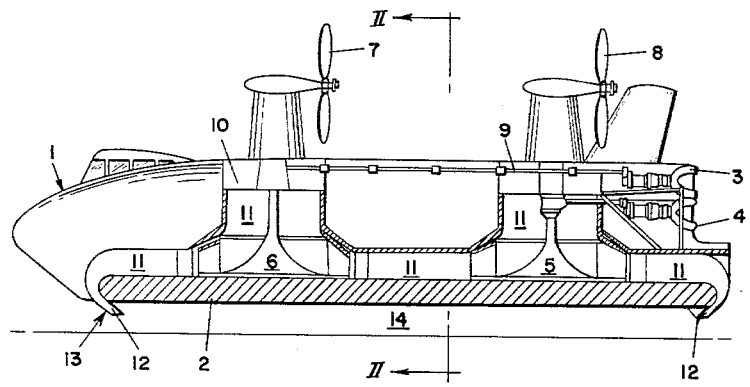
FIGURE 1 is a longitudinal cross section through a ground effect vehicle of the kind set forth.
Figure 2:
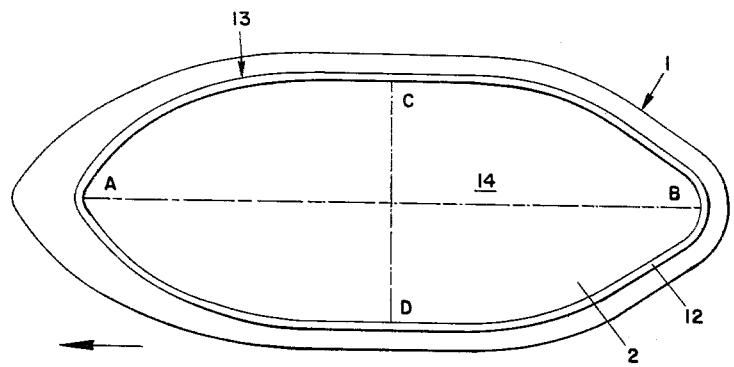
FIGURE 2 is an inverted plan of the vehicle showing the gas cushion planform area.

In carrying the invention into effect according to one convenient form with reference to FIGURES 1 and 2, a ground effect vehicle generally indicated at 1 is provided having a base platform 2 which includes buoyancy tanks for operation of the vehicle in water. Engines 3 and 4 arranged in pairs provide power for operating lift fans 5 and 6 and also power for operating propulsion propellers 7 and 8. The fans 5 and 6 cause air to be drawn through air intakes 9 and 10, from whence it is forced under pressure through rigid ducting 11 to issue from annular nozzles 12 disposed within flexible skirting 13. The skirting 13, which extends the base platform 2 of the vehicle 1 in a manner as to extend the rigid ducting 11, may be applied around substantially the whole of the periphery of the base platform 2 or alternatively may be applied at least along the sides of the base platform 2 between the bow and stern of the vehicle. The air issuing from the nozzle 12, forms a fluid curtain which generates and maintains a ground effect cushion of pressurized air which, in operation of the vehicle, exists between the base platform 2 and the surface over which the vehicle is to travel.

According to the present invention the vehicle 1 is constructed so that the dimension of the fore and aft axis A–B of the planform area 14 of the cushion is longer than the beam axis C–D dimension thereof. Generally speaking, as in this case, these dimensions will correspond to the main dimensions of the base platform 2.

Preferably flexible skirting 13 is secured to and adapted to extend downwardly below the base platform 2 by a distance not greater than one fifth the minimum main dimension of the platform area of the cushion which is usually, as in this case, the beam axis dimension C–D.

Figure 3:
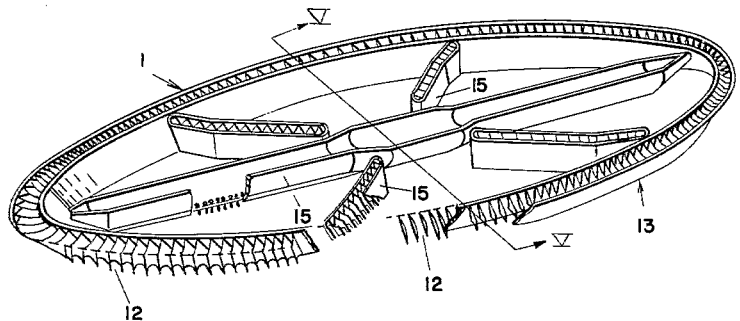
FIGURE 3 is a top plan of a flexible skirting arrangement showing the stability keels which form separate cushion compartments.
Figure 4:
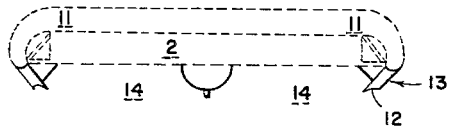
FIGURE 4 is a cross section through the flexible keel arrangement substantially on line IV—IV of FIGURE 3.
Figure 5:
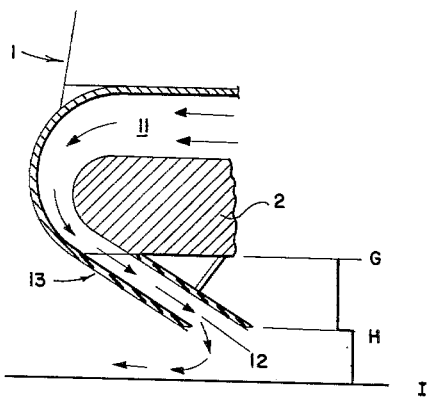
FIGURE 5 is an enlarged sectional detail of the jet orifice in the flexible skirting.

When a ground effect vehicle is fitted with peripheral jet skirting 13, it may be desirable to incorporate a stability jet system 15 (FIGURES 3 and 4), which discharges air or gas into the ground effect pressurised cushion 14 beneath the base platform to provide "compartmentation" of the cushion 14, and this should also be extended flexibly below the platform.

The strength of the flexible material from which such flexible components as skiriting 13 and stability jet system 15 are made should not be less than 500 lbs. per inch run throughout the skirt 13 and preferably of a strength in lbs. per inch run which is 250 times the distance measured in feet that the skirt 13 extends below the base structure for skirts extending below the platform by a distance exceeding two feet. When such flexible components are constructed to have the preferred stated strength, the best degree of flexible rigidity for high speed over-the-water operation is provided, commensurate with local deflection or deformation resistance as a result of wave or obstacle impact. In this connection, it will be realised that the invention provides means by which a suitable make up of flexible material can be selected or constructed to suit ground effect vehicles of any particular size. Moreover, it will also be seen that the invention provides, in its preferred and most advantageous form, a progressive and uniform scaling-up of material strength as the size of the vehicle and flexible depending components increase.

I claim as my invention:

A ground effect vehicle comprising a base platform including pressurized fluid supporting cushion generating means and a skirting extending below the base platform in a manner as to retard the escape of the pressurized fluid supporting cushion so as to increase the clearance height of the vehicle during the operation by giving way and passing over encountered obstacles, characterized in that said skirting extends below said base platform by a distance exceeding two feet and is fabricated from highly flexible material providing a strength throughout the skirting in pounds per inch run which is substantially 250 times the distance in feet the skirting extends below the base platform.

References Cited by the Examiner

UNITED STATES PATENTS

| | | | |
|---|---|---|---|
| 3,073,004 | 1/1963 | Zeise | 161—95 X |
| 3,078,940 | 2/1963 | Rolle | 180—7 |

FOREIGN PATENTS

| | | |
|---|---|---|
| 232,436 | 2/1961 | Australia. |
| 860,781 | 2/1961 | Great Britian. |
| 1,238,499 | 7/1960 | France. |

A. HARRY LEVY, *Primary Examiner.*

FERGUS S. MIDDLETON, *Examiner.*